US012694845B2

(12) United States Patent

Yeom et al.

(10) Patent No.: US 12,694,845 B2
(45) Date of Patent: Jul. 28, 2026

(54) RESPONSE SPEED EVALUATION SYSTEM FOR DISPLAY DEVICE, RESPONSE SPEED EVALUATION SYSTEM FOR ELECTRONIC DEVICE, AND METHOD DRIVING THE RESPONSE SPEED EVALUATION SYSTEM FOR THE DISPLAY DEVICE

(71) Applicant: Samsung Display Co., Ltd., Yongin-si (KR)

(72) Inventors: Dong-Yeol Yeom, Yongin-si (KR); Hyosun Kim, Yongin-si (KR); Yongwoo Yi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/080,451

(22) Filed: Mar. 14, 2025

(65) Prior Publication Data

US 2025/0372055 A1 Dec. 4, 2025

(30) Foreign Application Priority Data

Jun. 3, 2024 (KR) ........................ 10-2024-0072575

(51) Int. Cl.
*G09G 3/36* (2006.01)

(52) U.S. Cl.
CPC ..... *G09G 3/3607* (2013.01); *G09G 2320/103* (2013.01); *G09G 2360/145* (2013.01)

(58) Field of Classification Search
CPC ... G09G 3/20–2096; G09G 3/36–3607; G09G 2320/103; G09G 2360/145
See application file for complete search history.

(56) References Cited

U.S. PATENT DOCUMENTS

2002/0024481 A1* 2/2002 Kawabe ............... G09G 3/3611 345/87
2009/0244102 A1* 10/2009 Nakagawa ........... G09G 3/3648 345/213
2021/0278711 A1* 9/2021 Chen ..................... G02F 1/0063

FOREIGN PATENT DOCUMENTS

KR 10-0875326 B1 12/2008
KR 10-2013-0015454 A 2/2013

OTHER PUBLICATIONS

Chester, Edward. "What is monitor response time?," located at https://www.pcgamesn.com/monitor-response-time, Feb. 8, 2024, 14 pages.

(Continued)

*Primary Examiner* — Hang Lin
(74) *Attorney, Agent, or Firm* — Womble Bond Dickinson (US) LLP

(57) ABSTRACT

A response speed evaluation system for a display device includes the display device configured to display a dynamic video, and to display a static image generated based on input grayscales of the dynamic video, a luminance measurer configured to measure a luminance of the static images, to measure a luminance of the dynamic video, to generate static image graphs based on the luminance of the static images, and to generate a dynamic video graph based on the luminance of the dynamic video, and a response speed evaluator configured to generate an input graph based on the static image graphs, to generate an output graph based on the dynamic video graph, and to compare the input graph and the output graph to evaluate a response speed of the display device.

20 Claims, 17 Drawing Sheets

(56) References Cited

OTHER PUBLICATIONS

HDTVTest. "We've All Been Duped by LED LCD's Input Lag vs OLED for Gaming—Here's the Truth [PROMOTED]," located at https://www.youtube.com/watch?v=Oy3cKwq6vEw, Nov. 15, 2021, 1 page.

* cited by examiner

STATIC IMAGE(SI)

DYNAMIC VIDEO(DV)

DYNAMIC VIDEO(DV)

RESPONSE SPEED EVALUATION SYSTEM FOR DISPLAY DEVICE, RESPONSE SPEED EVALUATION SYSTEM FOR ELECTRONIC DEVICE, AND METHOD DRIVING THE RESPONSE SPEED EVALUATION SYSTEM FOR THE DISPLAY DEVICE

CROSS-REFERENCE TO RELATED APPLICATION

The present application claims priority to, and the benefit of, Korean Patent Application No. 10-2024-0072575, filed on Jun. 3, 2024, in the Korean Intellectual Property Office, the entire disclosure of which is incorporated herein by reference.

BACKGROUND

1. Field

Embodiments of the present disclosure relate to a response speed evaluation system for display, a response speed evaluation system for an electronic device, and a method of driving the response speed evaluation system for the display for evaluating a response speed of the display.

2. Description of the Related Art

A display may include a display panel including a plurality of pixels. The display may receive an input grayscale, and the display may display an image based on the input grayscale. When the input grayscale is changed, a luminance of the display may not immediately change to a target luminance, but may be changed to the target luminance over some amount of time (e.g., a response time of the display).

One of methods of evaluating a response speed of the display is a method of measuring the response time of the display. However, a response time of the display may vary depending on characteristics of the display. If the input grayscale is not changed during the response time of the display, the method of measuring the response time of the display may be useful. However, if the input grayscale is changed during the response time of the display, the method of measuring the response time of the display may not be useful.

SUMMARY

Embodiments of the present disclosure provide a response speed evaluation system for evaluating a response speed of a display displaying a dynamic image.

Embodiments of the present disclosure provide a method of driving the response speed evaluation system.

In one or more embodiments of a response speed evaluation system for a display according to the present disclosure, the response speed evaluation system for the display includes the display device configured to display a dynamic video, and to display a static image generated based on input grayscales of the dynamic video, a luminance measurer configured to measure a luminance of the static images, to measure a luminance of the dynamic video, to generate static image graphs based on the luminance of the static images, and to generate a dynamic video graph based on the luminance of the dynamic video, and a response speed evaluator configured to generate an input graph based on the static image graphs, to generate an output graph based on the dynamic video graph, and to compare the input graph and the output graph to evaluate a response speed of the display device.

The response speed evaluator may be configured to scale the static image graphs based on a maximum luminance and a minimum luminance of the static image graphs to normalize the static image graphs.

The response speed evaluator may be configured to calculate a representative value of a luminance of the static image graphs.

The representative value of the luminance of the static image graphs may be a median value of the luminance of the static image graphs.

The response speed evaluator may be configured to combine the static image graphs based on the representative value of the luminance of the static image graphs to generate the input graph.

The response speed evaluator may be configured to scale the dynamic video graph based on a maximum luminance and a minimum luminance of the dynamic video graph to normalize the dynamic video, and to generate the output graph.

The response speed of the display device may increase as similarity between the output graph and the input graph increases.

The response speed evaluator may be configured to evaluate the response speed of the display device based on a difference between an area of the input graph and an area of the output graph.

The difference between the area of the input graph and the area of the output graph may correspond to a similarity index that is calculated by $$S_{IND} = \left\{ 1 - \frac{\int |OG_{LUM} - IG_{LUM}|}{\int IG_{LUM}} \right\} \times 100,$$

S_IND being the similarity index, IG_LUM being a luminance of the input graph, and OG_LUM being a luminance of the output graph.

The difference between the area of the input graph and the area of the output graph may decrease and the response speed of the display device may increase as the similarity index increases.

In one or more embodiments of a response speed evaluation system for an electronic device according to the present disclosure, the response speed evaluation system for the electronic device includes the electronic device including a display device configured to display a dynamic video and to display a static image generated based on input grayscales of the dynamic video, and a processor configured to control the display device, a luminance measurer configured to measure a luminance of the static images, to measure a luminance of the dynamic video, to generate static image graphs based on the luminance of the static images, and to generate a dynamic video graph based on the luminance of the dynamic video, and a response speed evaluator configured to generate an input graph based on the static image graphs, to generate an output graph based on the dynamic video graph, and to compare the input graph and the output graph to evaluate a response speed of the display device.

In one or more embodiments of a method of driving a response speed evaluation system for a display according to the present disclosure, the method includes determining an input grayscale of static images based on input grayscales of a dynamic video, measuring a luminance of the static images, measuring a luminance of the dynamic video, generating static image graphs based on the luminance of the static images, generating a dynamic video graph based on the luminance of the dynamic video, generating an input graph based on the static image graphs, generating an output graph based on the dynamic video graph, and comparing the input graph and the output graph to evaluate a response speed of the display device.

The generating the input graph and the generating the output graph may include scaling the static image graphs based on a maximum luminance and a minimum luminance of the static image graphs to normalize the static image graphs.

The generating the input graph and the generating the output graph may further include calculating a representative value of a luminance of the static image graphs.

The representative value of the luminance of the static image graphs may include a median value of the luminance of the static image graphs.

The generating the input graph and the generating the output graph may further include combining the static image graphs based on the representative value of the luminance of the static image graphs to generate the input graph.

The generating the input graph and the generating the output graph may further include scaling the dynamic video graph based on a maximum luminance and a minimum luminance of the dynamic video graph to normalize the dynamic video and to generate the output graph.

The response speed of the display device may increase as a similarity between the output graph and the input graph increases.

The response speed of the display device may correspond to a difference between an area of the input graph and an area of the output graph.

The difference between the area of the input graph and the area of the output graph may correspond to a similarity index calculated by $$S_{IND} = \left\{ 1 - \frac{\int |OG_{LUM} - IG_{LUM}|}{\int IG_{LUM}} \right\} \times 100,$$

S_IND being the similarity index, IG_LUM being a luminance of the input graph, and OG_LUM being a luminance of the output graph.

According to the response speed evaluation system and the method of driving the response speed evaluation system, the input grayscale of each of the static images may be determined based on the input grayscales of the dynamic video. The static image graphs may be generated based on the luminance of each of the static images, and the dynamic video graph may be generated based on the luminance of the dynamic video. The input graph may be generated based on the static image graphs, and the output graph may be generated based on the dynamic video graph. The response speed of the display may be evaluated by comparing the input graph and the output graph. Therefore, the response speed of the display displaying the dynamic video may be evaluated.

BRIEF DESCRIPTION OF THE DRAWINGS

The above and other aspects of embodiments of the present disclosure will become more apparent by describing in detailed embodiments thereof with reference to the accompanying drawings, in which.

DETAILED DESCRIPTION

Figure 1:
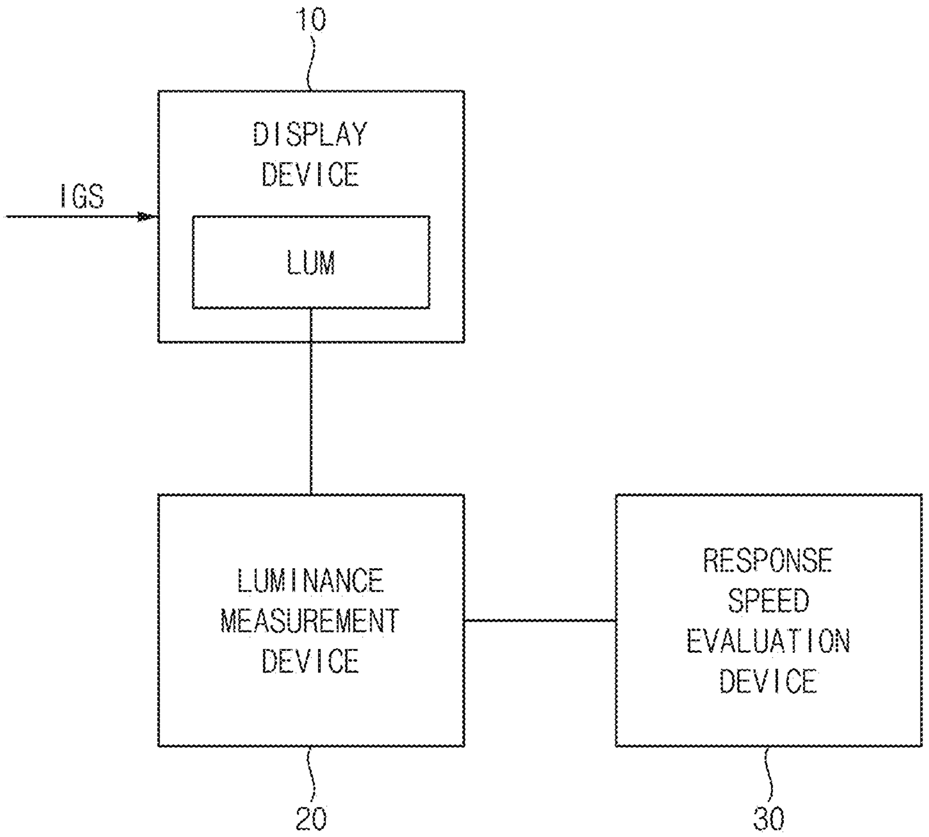
FIG. 1 is a block diagram showing a response speed evaluation system according to embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of “can,” “may,” or “may not” in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

It will be understood that when an element, layer, region, or component (e.g., an apparatus, a device, a circuit, a wire, an electrode, a terminal, a conductive film, etc.) is referred to as being "formed on," "on," "connected to," or "(operatively, functionally, or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection.

For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a transistor, a resistor, an inductor, a capacitor, a diode and/or the like. Accordingly, a connection is not limited to the connections illustrated in the drawings or the detailed description and may also include other types of connections. In describing embodiments, an expression of connection indicates electrical connection unless explicitly described to be direct connection, and "directly connected/directly coupled," or "directly on," refers to one component directly connecting or coupling another component, or being on another component, without an intermediate component.

Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XY, YZ, and XZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." Furthermore, the expression "being the same" may mean "being substantially the same". In other words, the expression "being the same" may include a range that can be tolerated by those of ordinary skill in the art. The other expressions may also be expressions from which "substantially" has been omitted.

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram showing a response speed evaluation system according to embodiments of the present disclosure.

Referring to FIG. 1, a response speed evaluation system according to embodiments of the present disclosure may include a display (e.g., display device) 10, a luminance measurer (e.g., luminance measurement device) 20, and a response speed evaluator (e.g., response speed evaluation device) 30.

The display 10 may receive an input grayscale IGS, and may emit a light based on the input grayscale IGS to display an image. A luminance LUM may be determined according to the input grayscale IGS. When the input grayscale IGS increases, the luminance LUM may increase. For example, a range of the input grayscale IGS may be 0 grayscale to 255 grayscale. For example, a luminance corresponding to 0 grayscale may be about 0 nit, and a luminance corresponding to 255 grayscale may be about 1000 nit.

The luminance measurer 20 may measure the luminance LUM. The luminance measurer 20 may generate a time-luminance graph including a light waveform based on the luminance LUM.

The response speed evaluator 30 may evaluate a response speed of the display 10 based on the time-luminance graph.

Figure 2:
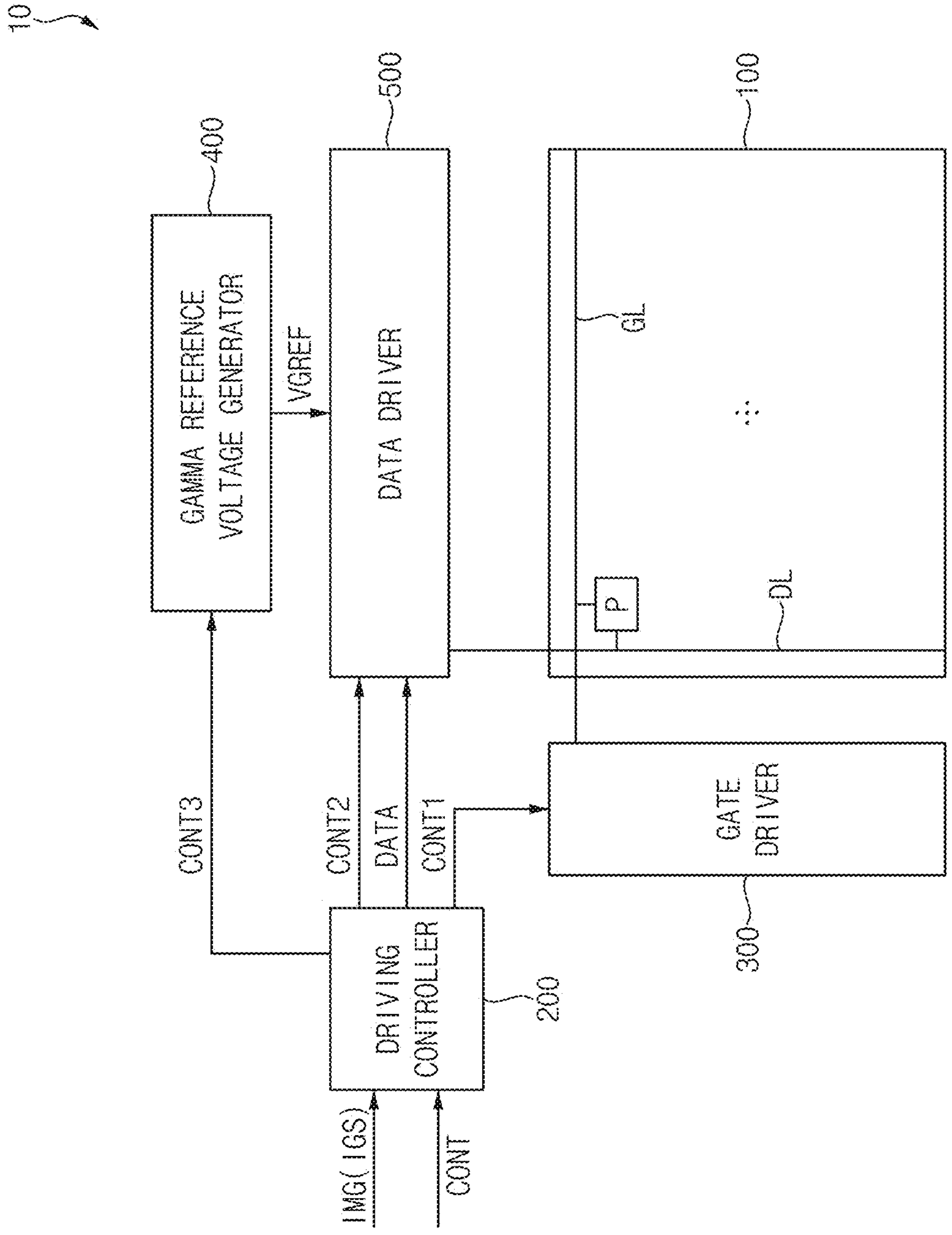
FIG. 2 is a block diagram showing a display of FIG. 1.

FIG. 2 is a block diagram showing a display 10 of FIG. 1.

Referring to FIG. 1 and FIG. 2, a display 10 may include a display panel 100 and a display panel driver. The display panel driver may include a driving controller 200, a gate driver 300, a gamma reference voltage generator 400, and a data driver 500.

The display panel 100 may include a display area for displaying an image, and a peripheral area adjacent to the display area.

The display panel 100 may include gate lines GL, data lines DL, pixels electrically connected to the gate lines GL and the data lines DL, respectively. The gate lines GL may extend in a first direction, and the data lines DL may extend in a second direction crossing the first direction.

The driving controller 200 may receive input image data IMG and an input control signal CONT from an external device, in one or more embodiments. For example, the input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the gate driver 300 based on the input control signal CONT, and may output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and may output the second control signal CONT2 to the data driver 500. The second control signal CONT2 may include a horizontal start signal and a load signal.

The driving controller 200 may generate a data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and may output the third control signal CONT3 to the gamma reference voltage generator 400.

The gate driver 300 may generate gate signals for driving the gate lines GL in response to the first control signal CONT1 received from the driving controller 200. The gate driver 300 may output the gate signals to the gate lines GL.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In one or more embodiments, the gamma reference voltage generator 400 may be located in the driving controller 200, or may be located in the data driver 500.

The data driver 500 may receive the second control signal CONT2 and the data signal DATA from the driving controller 200, and may receive the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

Figure 3:
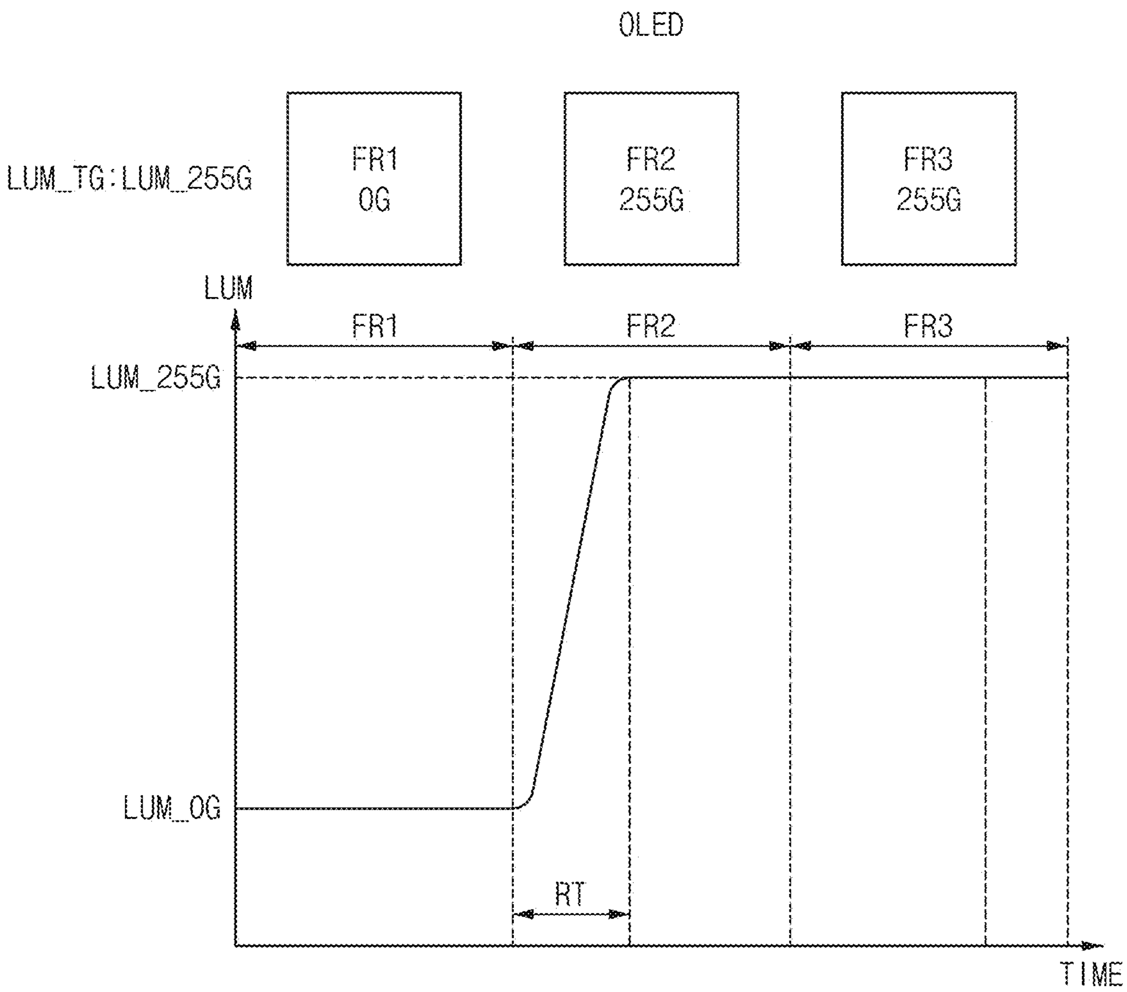
FIG. 3 is a diagram showing a time-luminance graph of an organic light-emitting display.
Figure 4:
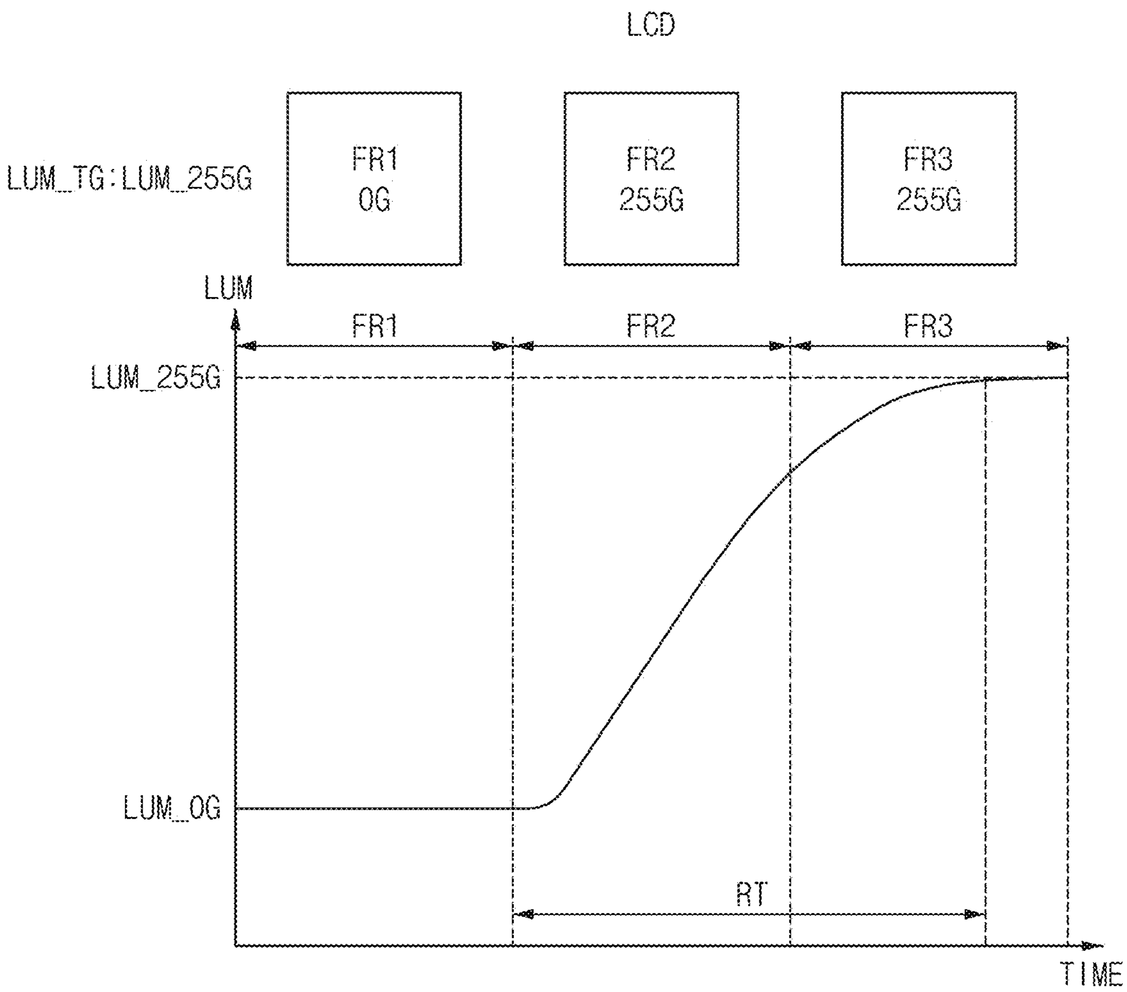
FIG. 4 is a diagram showing a time-luminance graph of a liquid crystal display.

FIG. 3 is a diagram showing a time-luminance graph of an organic light-emitting display. FIG. 4 is a diagram showing a time-luminance graph of a liquid crystal display.

Referring to FIGS. 1 to 4, when an input grayscale IGS is changed, a luminance LUM may be changed. For example, an input grayscale IGS of a first frame FR1 may be 0 grayscale, an input grayscale IGS of A second frame FR2 may be 255 grayscale, and an input grayscale IGS of a third frame FR3 may be 255 grayscale. That is, the input grayscale IGS may be changed from 0 grayscale to 255 grayscale, and a target luminance LUM_TG may be 255 grayscale. Accordingly, the luminance LUM may be changed from a luminance corresponding to 0 grayscale LUM_0G to a luminance corresponding to 255 grayscale LUM_255G.

However, when the input grayscale IGS is changed, the luminance LUM is not immediately changed to the target luminance LUM_TG, but may be changed to the target luminance LUM_TG over a corresponding amount of a time (e.g., a response time RT of the display 10).

The response time RT may vary depending on characteristics of the display 10. For example, as shown in FIG. 3, a response time RT of an organic light-emitting display (OLED) may be shorter than one frame. For example, as shown in FIG. 4, a response time RT of a liquid crystal display LCD may be longer than one frame.

A display quality of the display 10 may vary depending on the response time RT of the display 10. The shorter the response time RT of the display 10, the faster the response speed of the display 10. The faster the response speed of the display 10, the better the display quality of the display 10.

One of methods of evaluating the response speed of the display 10 is a method of evaluating the response speed of the display 10 based on the response time RT. For example, because the response time RT of the organic light-emitting display is shorter than the response time RT of the liquid crystal display, the response speed of the organic light-emitting display may be faster than a response speed of the liquid crystal display, and a display quality of the organic light-emitting display may be better than a display quality of the liquid crystal display. However, the method of evaluating the response speed of the display 10 based on the response time RT has a limitation. The limitation will be described later in FIGS. 5 to 7.

Figure 5:
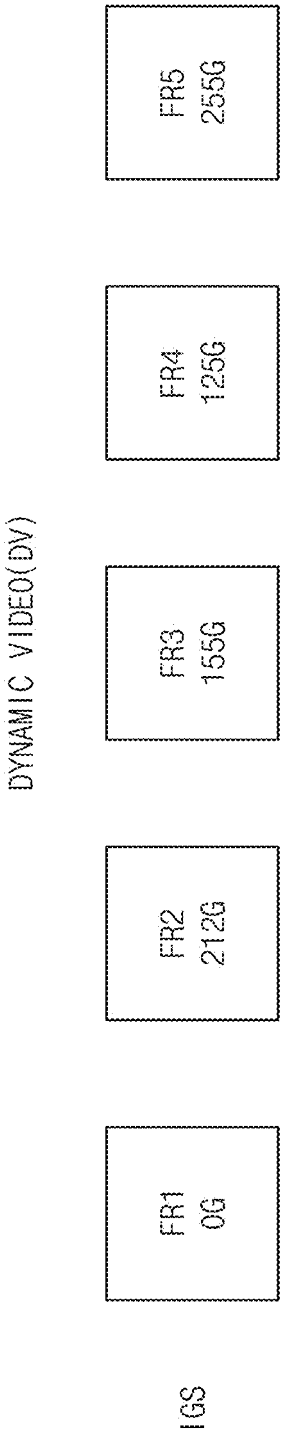
FIG. 5 is a diagram showing input grayscales of a dynamic video.
Figure 6:
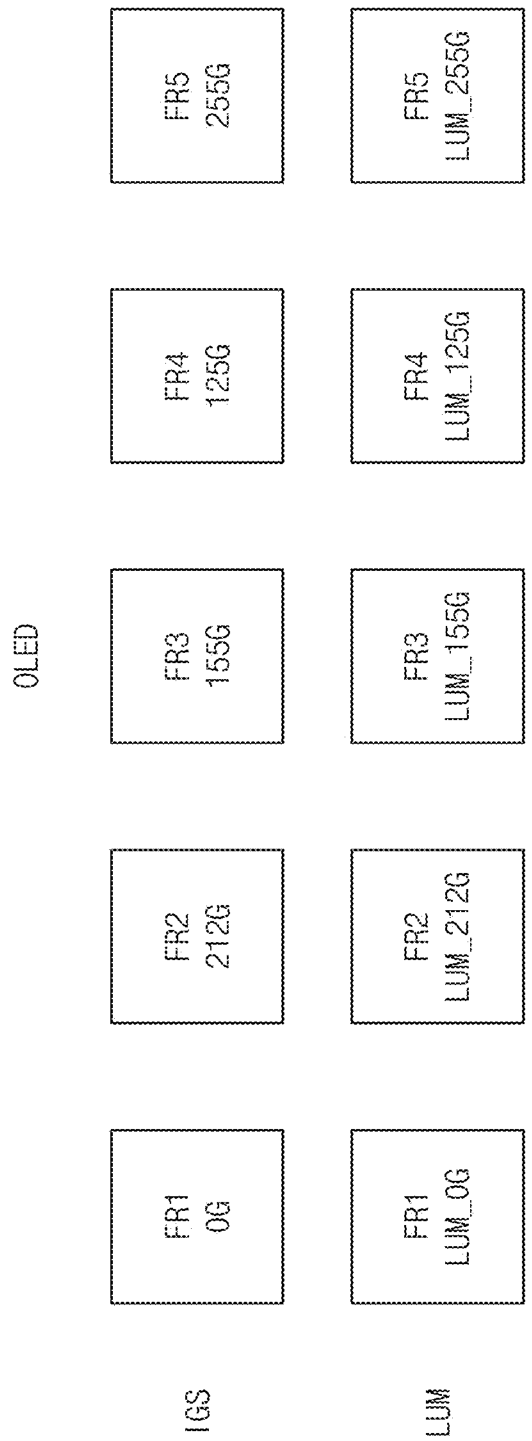
FIG. 6 is a diagram showing a luminance of an organic light-emitting display which receives input grayscales of a dynamic video of FIG. 5.
Figure 7:
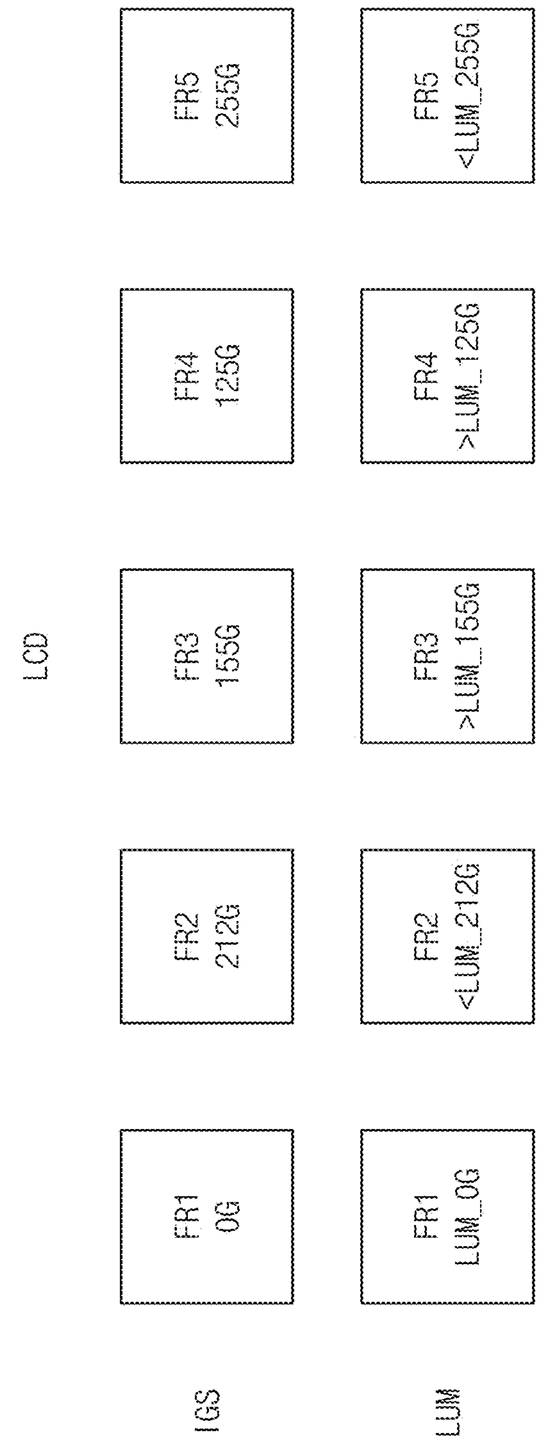
FIG. 7 is a diagram showing a luminance of a liquid crystal display which receives input grayscales of a dynamic video of FIG. 5.

FIG. 5 is a diagram showing input grayscales IGS of a dynamic video DV. FIG. 6 is a diagram showing a luminance LUM of an organic light-emitting display that receives input grayscales IGS of a dynamic video DV of FIG. 5. FIG. 7 is a diagram showing a luminance LUM of a liquid crystal display that receives input grayscales IGS of a dynamic video DV of FIG. 5.

Referring to FIGS. 1 to 7, an image of a display 10 viewed by a user might not be changed slowly as shown in FIGS. 3 and 4, but instead may be changed quickly as shown in FIG. 5. That is, the image of the display 10 viewed by the user may be a dynamic video DV. For example, an input grayscale IGS of a first frame FR1 may be 0 grayscale, an input grayscale IGS of a second frame FR2 may be 212 grayscale, an input grayscale IGS of a third frame FR3 may be 155 grayscale, an input grayscale IGS of a fourth frame FR4 may be 125 grayscale, and an input grayscale IGS of a fifth frame FR5 may be 255 grayscale. As such, the input grayscale IGS may be changed for each frame.

A response time RT may vary depending on characteristics of the display 10. Therefore, a luminance LUM of a display 10 displaying the dynamic video DV may vary depending on the characteristics of the display 10. For example, as shown in FIG. 6, an organic light-emitting display may have a luminance LUM_0G corresponding to 0 grayscale in the first frame FR1, a luminance LUM_212G corresponding to 212 grayscale in the second frame FR2, a luminance LUM_155G corresponding to 155 grayscale in the third frame FR3, a luminance LUM_125G corresponding to 125 grayscale in the fourth frame FR4, and a luminance LUM_255G corresponding to 255 grayscale in the fifth frame FR5. For example, as shown in FIG. 7, a liquid crystal display may have the luminance LUM_0G corresponding to 0 grayscale in the first frame FR1, may have a luminance LUM less than the luminance LUM_212G corresponding to 212 grayscale in the second frame FR2, may have a luminance LUM greater than the luminance LUM_155G corresponding to 155 grayscale in the third frame FR3, may have a luminance LUM greater than the luminance LUM_125G corresponding to 125 grayscale in the fourth frame FR4, and may have a luminance LUM less than the luminance LUM_255G corresponding to 255 grayscale in the fifth frame FR5.

As such, the luminance LUM may not reach a target luminance LUM_TG depending on the characteristics of the display 10, and the response time RT may not be calculated. Therefore, the method of evaluating a response speed of the display 10 based on the response time RT may not be suitable for evaluating a response speed of the display 10 displaying the dynamic video DV.

A method of driving a response speed evaluation system according to embodiments of the present disclosure, and for evaluating the response speed of the display 10 displaying the dynamic video DV, will be described in the diagrams below.

Figure 8:
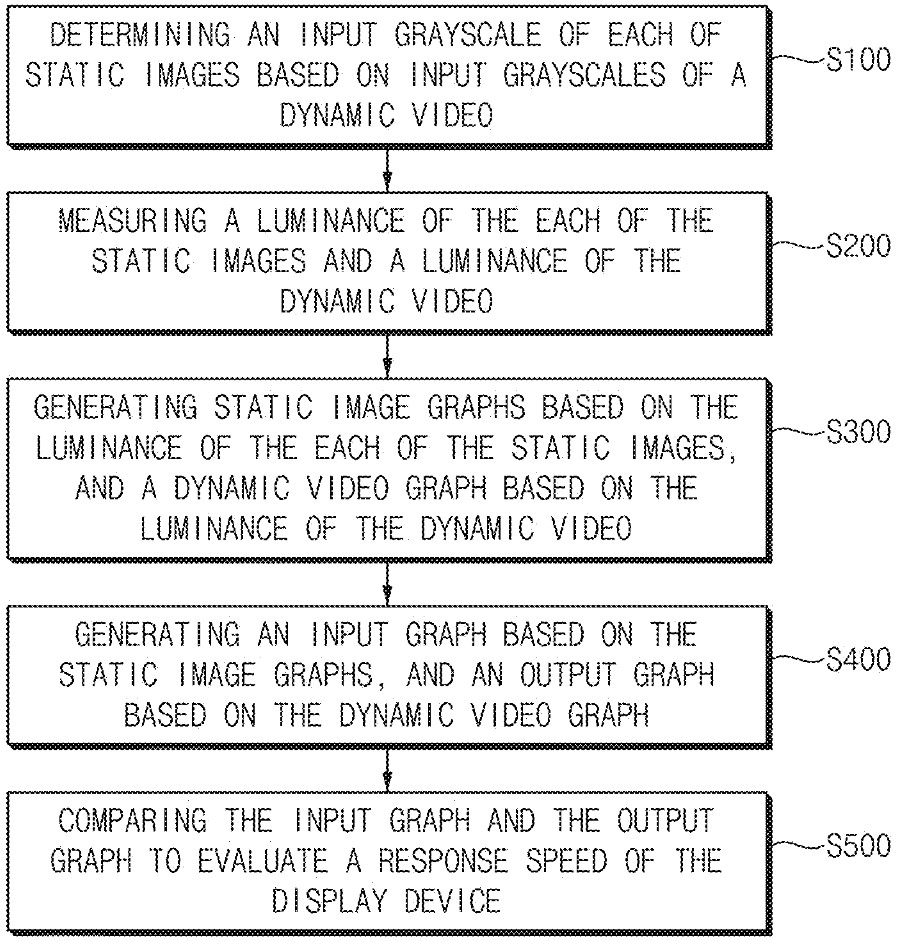
FIGS. 8 and 9 are flowcharts showing a method of driving a response speed evaluation system according to embodiments of the present disclosure.
Figure 9:
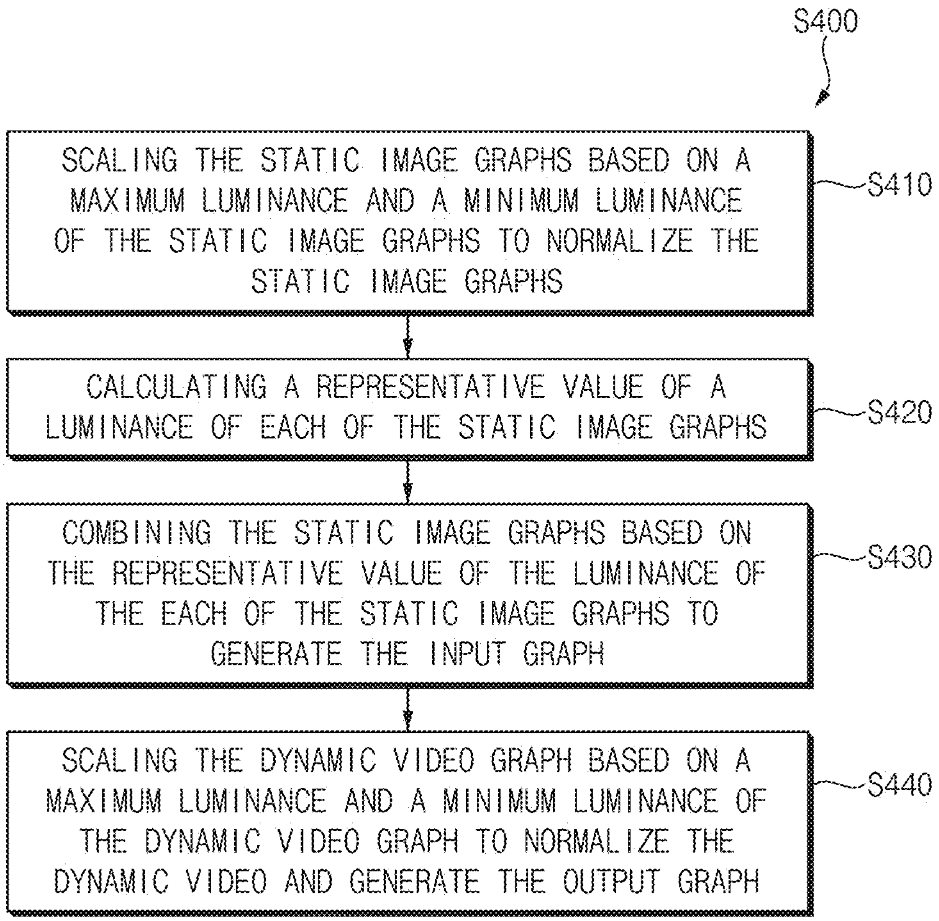

FIGS. 8 and 9 are flowcharts showing a method of driving a response speed evaluation system according to embodiments of the present disclosure.

Referring to FIGS. 1 to 9, a method of driving a response speed evaluation system according to embodiments of the present disclosure may include determining an input grayscale IGS of each of static images based on input grayscales IGS of a dynamic video (operation S100), measuring a luminance LUM of the each of the static images and a luminance LUM of the dynamic video DV (operation S200), generating static image graphs based on the luminance LUM of the each of the static images, and generating a dynamic video graph based on the luminance LUM of the dynamic video DV (operation S300), generating an input graph based on the static image graphs, and generating an output graph based on the dynamic video graph (operation S400), and comparing the input graph and the output graph to evaluate a response speed of the display 10 (operation S500).

The generating the input graph and the output graph (operation S400) may include scaling the static image graphs based on a maximum luminance and a minimum luminance of the static image graphs to normalize the static image graphs (operation S410), calculating a representative value of a luminance of each of the static image graphs (operation S420), combining the static image graphs based on the representative value of the luminance of the each of the static image graphs to generate the input graph (operation S430), and scaling the dynamic video graph based on a maximum luminance and a minimum luminance of the dynamic video graph to normalize the dynamic video and generate the output graph (operation S440).

Figure 10:
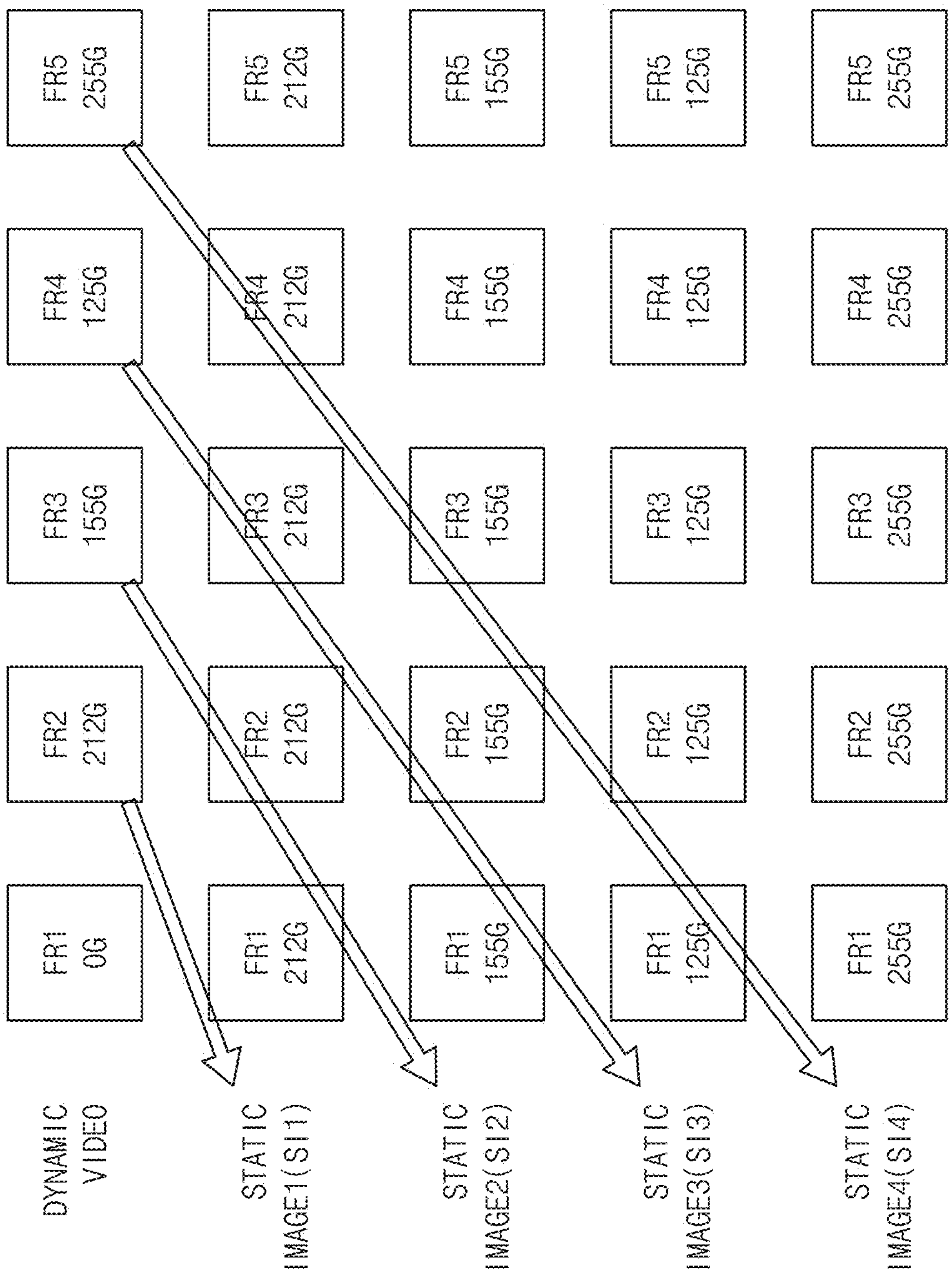
FIG. 10 is a diagram showing input grayscales of a dynamic video and an input grayscale of each of static images.
Figure 11:
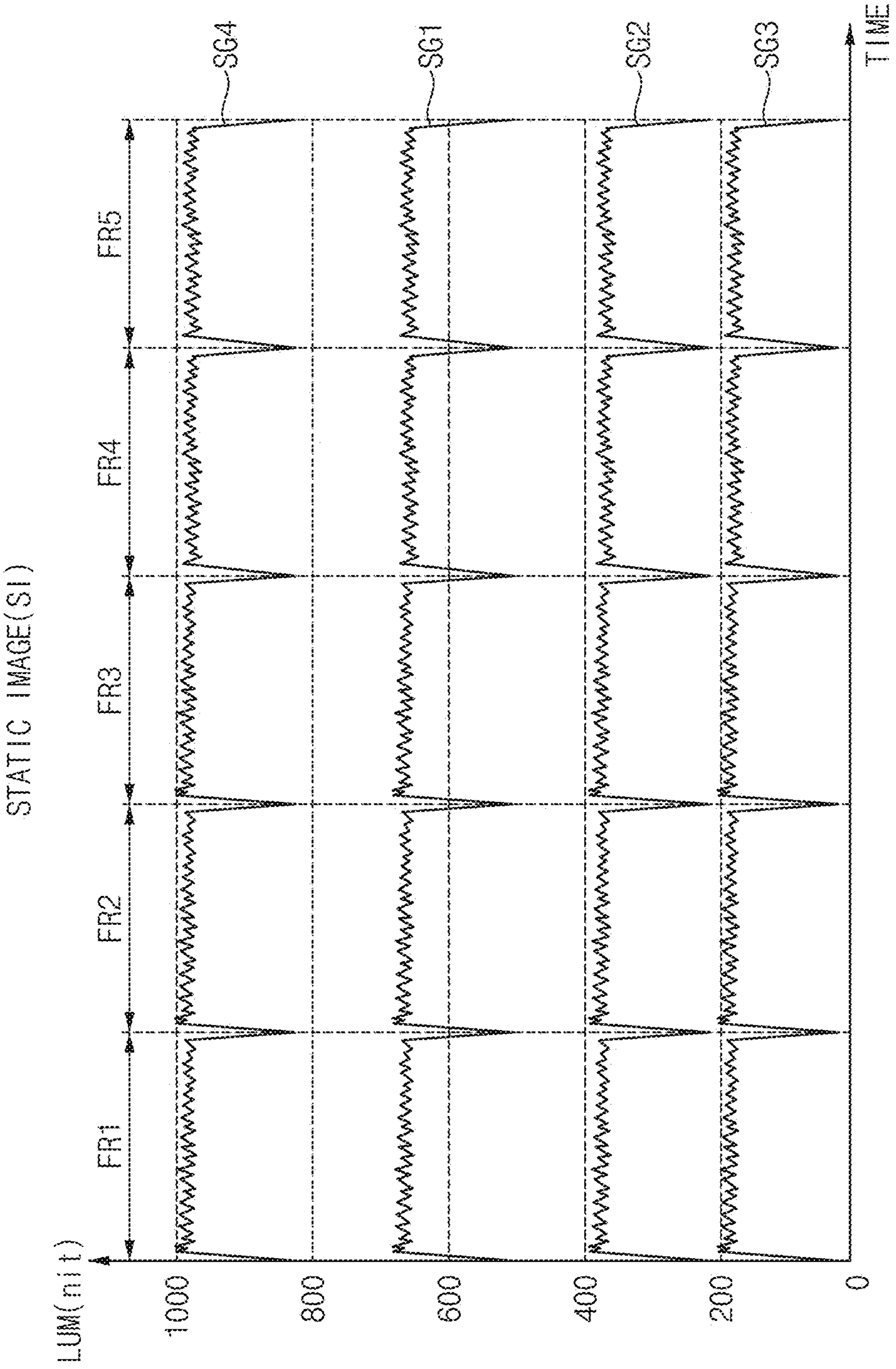
FIGS. 11 and 12 are diagrams showing static image graphs.
Figure 12:
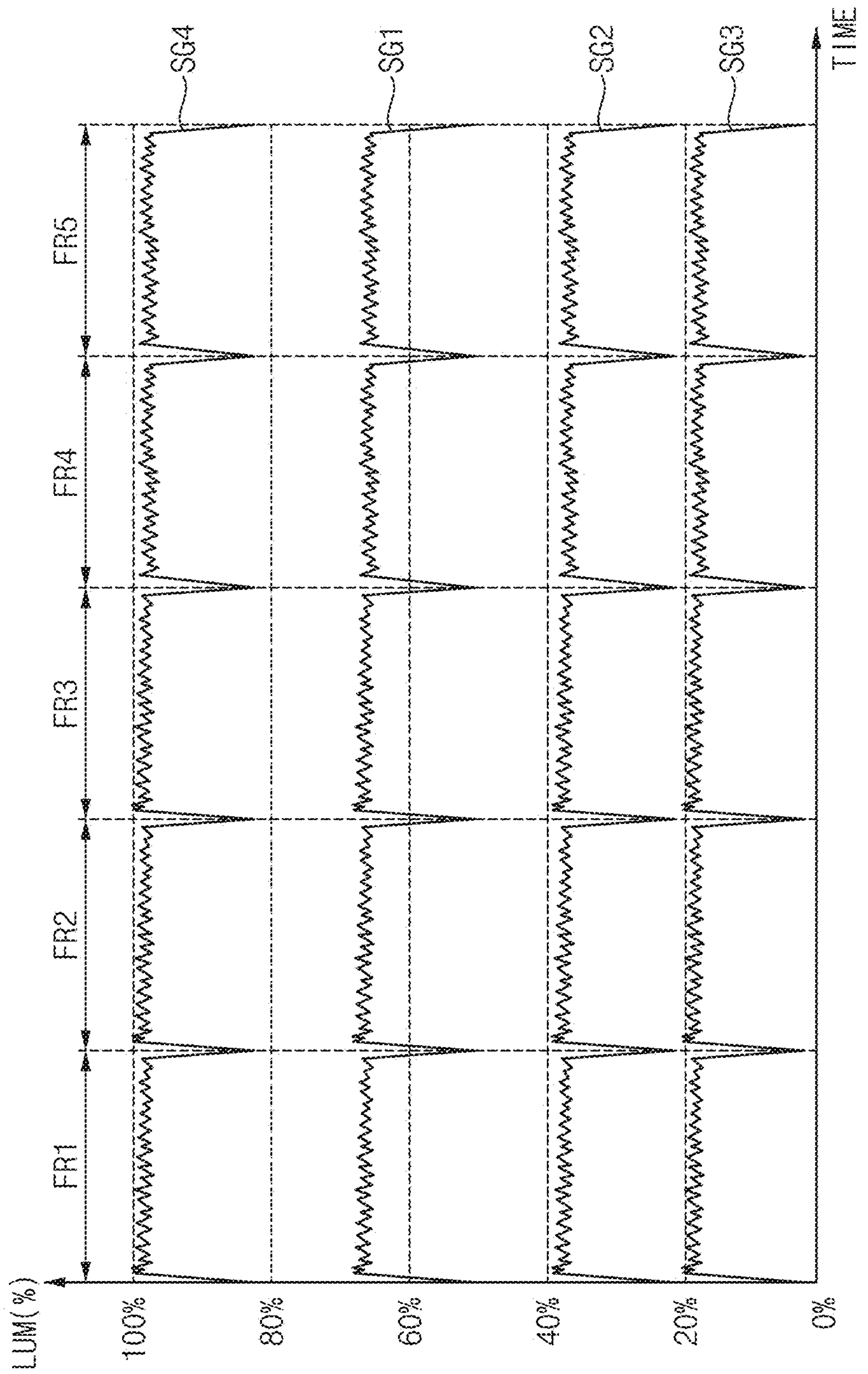
Figure 13:
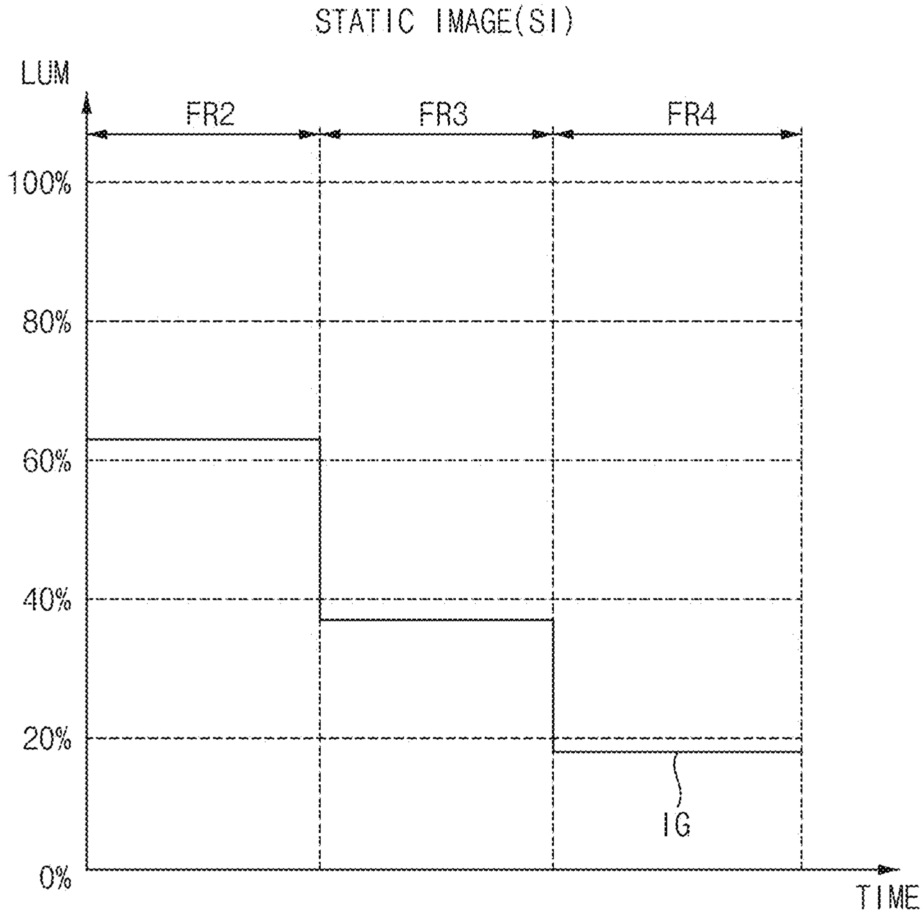
FIG. 13 is a diagram showing an input graph.
Figure 14:
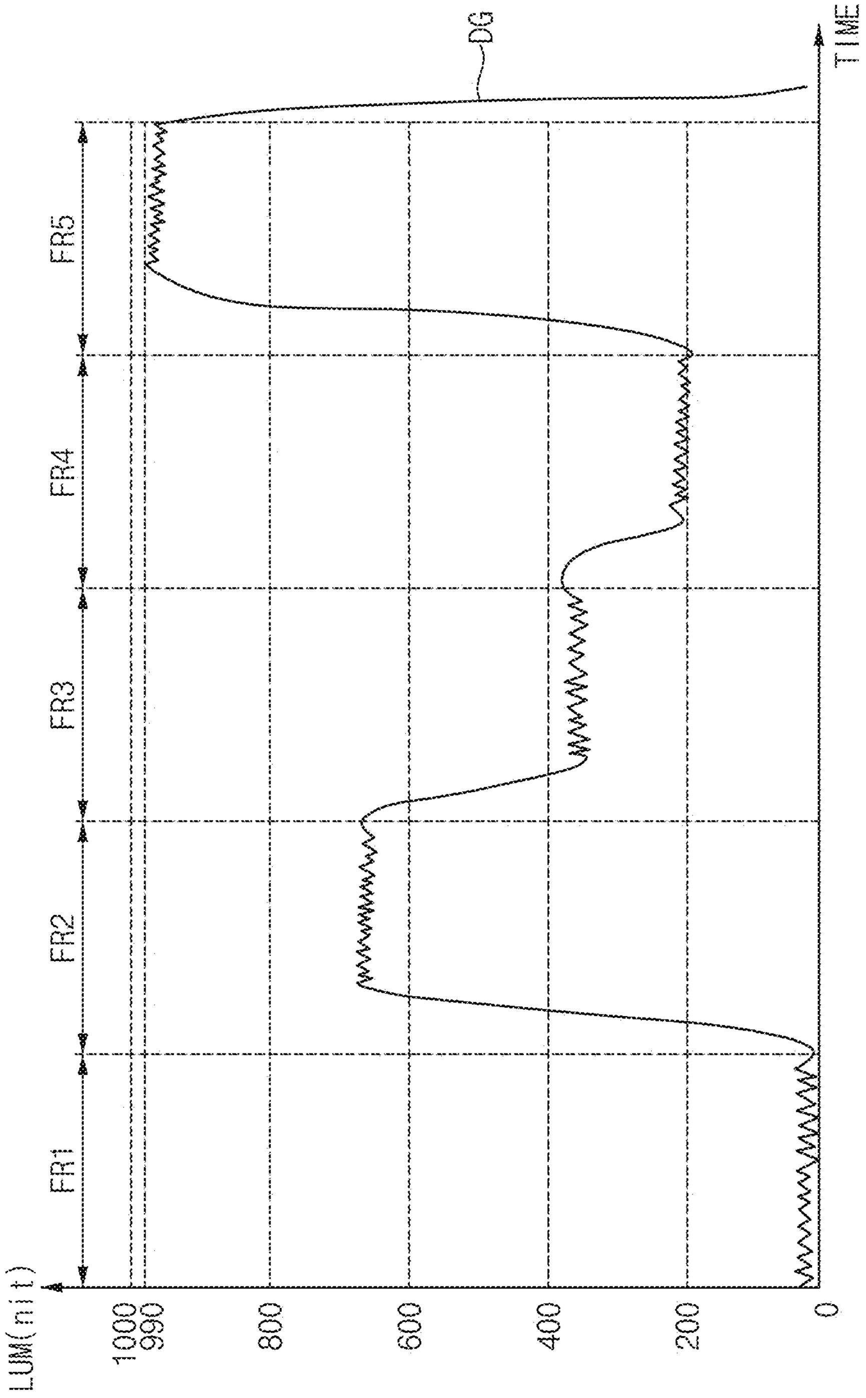
FIG. 14 is a diagram showing a dynamic video graph.
Figure 15:
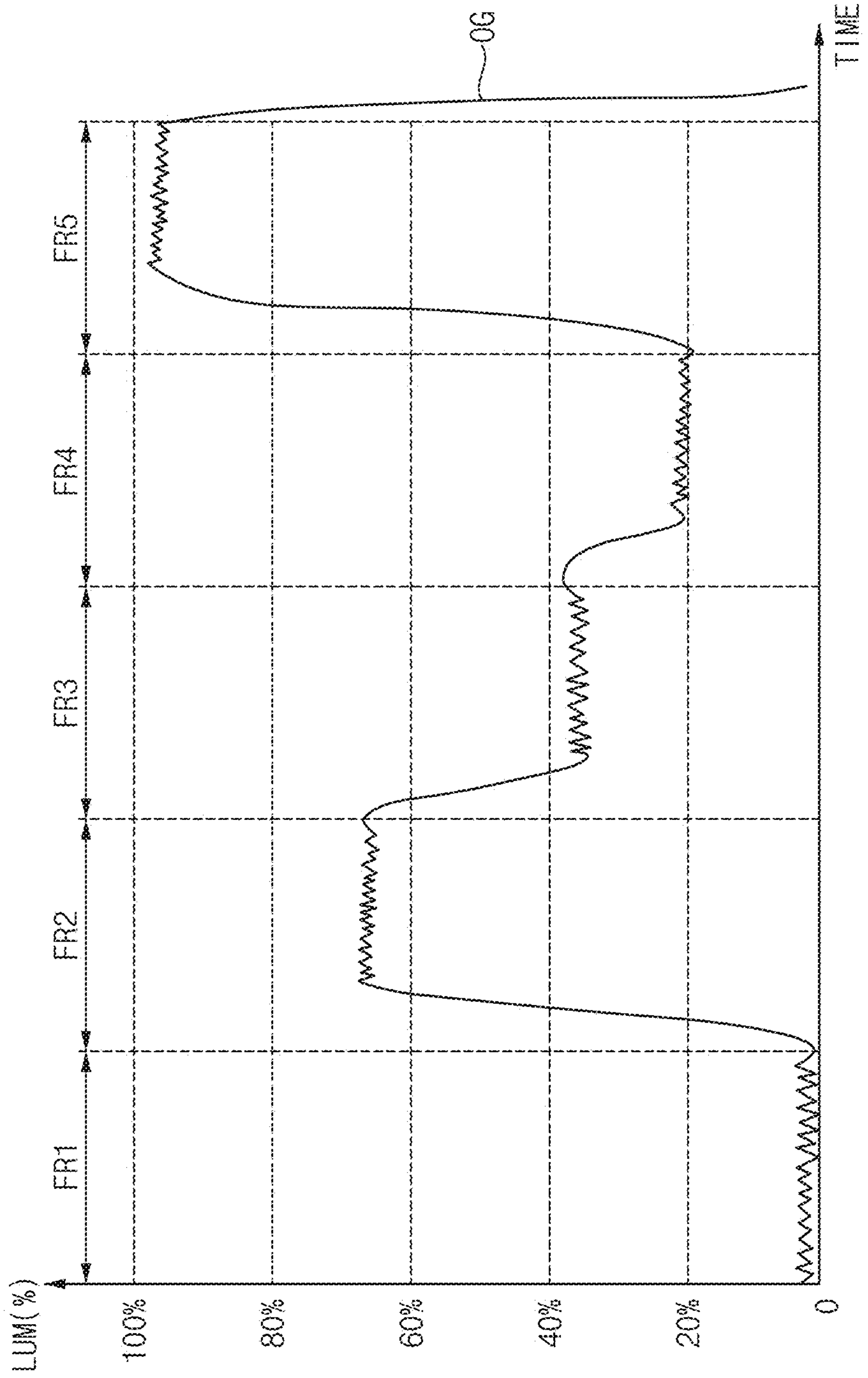
FIG. 15 is a diagram showing an output graph.

FIG. 10 is a diagram showing input grayscales IGS of a dynamic video DV and an input grayscale IGS of each of static images SI. FIGS. 11 and 12 are diagrams showing static image graphs SG1, SG2, SG3, SG4. FIG. 13 is a diagram showing an input graph IG. FIG. 14 is a diagram showing a dynamic video graph DG. FIG. 15 is a diagram showing an output graph OG.

Referring to FIGS. 1 to 15, to evaluate a response speed of a display 10, a response speed evaluation system according to embodiments of the present disclosure may use a dynamic video DV and static images SI. As shown in FIG.

10, an input grayscale IGS of each of the static images SI may be determined based on an input grayscale IGS of the dynamic video DV.

For example, the input grayscales IGS of the dynamic video DV may be 0 grayscale in a first frame FR1, 212 grayscale in a second frame FR2, 155 grayscale in a third frame FR3, 125 grayscale in a fourth frame FR4, and 255 grayscale in a fifth frame FR5.

For example, the static images SI may include first to fourth static images SI1, SI2, SI3, SI4. For example, an input grayscale IGS of the first static image SI1 may be determined based on an input grayscale IGS of the second frame FR2 of the dynamic video DV, and the input grayscale IGS of the first static image SI may be 212 grayscales during the first to fifth frames FR1, . . . , FR5. For example, an input grayscale IGS of the second static image SI2 may be determined based on an input grayscale IGS of the third frame FR3 of the dynamic video DV, and the input grayscale IGS of the second static image SI2 may be 155 grayscales during the first to fifth frames FR1, . . . , FR5. For example, an input grayscale IGS of the third static image SI3 may be determined based on an input grayscale IGS of the fourth frame FR4 of the dynamic video DV, and the input grayscale IGS of the third static image SI3 may be 125 grayscale during the first to fifth frames FR1, . . . , FR5. For example, an input grayscale IGS of the fourth static image SI4 may be determined based on an input grayscale IGS of the fifth frame FR5 of the dynamic video DV, and the input grayscale IGS of the fourth static image SI4 may be 255 grayscale during the first to fifth frames FR1, . . . , FR5.

The display 10 may receive the input grayscale IGS of each of the static images SI. The display 10 may display the static images SI by emitting light based on the input grayscale IGS of the each of the static images SI.

A luminance measurer 20 may measure a luminance LUM of the each of the static images SI. For example, the luminance LUM of the each of the static images SI may be measured for each 0.1-millisecond interval, for example. As shown in FIG. 11, the luminance measurer 20 may generate static image graphs based on the luminance LUM of the each of the static images SI. For example, the static image graphs may include first to fourth static image graphs SG1, SG2, SG3, SG4.

For example, the first static image graph SG1 may be generated based on the luminance LUM of the first static image SI1, the second static image graph SG2 may be generated based on the luminance LUM of the second static image SI2, the third static image graph SG3 may be generated based on the luminance LUM of the third static image SI3, and the fourth static image graph SG4 may be generated based on the luminance LUM of the fourth static image SI4.

A response speed evaluator 30 may scale the static image graphs SG1, SG2, SG3, SG4 based on a maximum luminance and a minimum luminance of the static image graphs SG1, SG2, SG3, SG4 to normalize the static image graphs SG1, SG2, SG3, SG4. For example, the maximum luminance of the static image graphs SG1, SG2, SG3, SG4 may be about 1000 nit, and the minimum luminance of the static image graphs SG1, SG2, SG3, SG4 may be about 0 nit. As shown in FIG. 12, when the static image graphs SG1, SG2, SG3, SG4 are scaled, a value corresponding to about 1000 nit may be 100%, and a value corresponding to about 0 nit may be 0%.

The response speed evaluator 30 may calculate a representative value of the luminance LUM of the each of the static image graphs SG1, SG2, SG3, SG4 to remove a noise of the static image graphs SG1, SG2, SG3, SG4. In one or more embodiments, the representative value of the luminance LUM of the each of the static image graphs SG1, SG2, SG3, SG4 may be a median value of the luminance LUM of the each of the static image graphs SG1, SG2, SG3, SG4. In one or more other embodiments, the representative value of the luminance LUM of the each of the static image graphs SG1, SG2, SG3, SG4 may be a mode value of the luminance LUM of the each of the static image graphs SG1, SG2, SG3, SG4. For example, the first static image graph SG1 may have a first representative value, the second static image graph SG2 may have a second representative value, the third static image graph SG3 may have a third representative value, and the fourth static image graph SG4 may have a fourth representative value.

The response speed evaluator 30 may combine the representative value of the luminance LUM of the each of the static image graphs SG1, SG2, SG3, SG4 to generate an input graph IG. For example, evaluation target frames may be the second to fourth frames FR2, FR3, FR4. As shown in FIG. 13, for example, the input graph IG may have a first representative value in the second frame FR2, a second representative value in the third frame FR3, and a third representative value in the fourth frame FR4. The first representative value may correspond to the input grayscale IGS of the second frame FR2 of the dynamic video DV, the second representative value may correspond to the input grayscale IGS of the third frame FR3 of the dynamic video DV, and the third representative value may correspond to the input grayscale IGS of the fourth frame FR4 of the dynamic video DV.

The display 10 may receive the input grayscales IGS of the dynamic video DV. The display 10 may emit a light based on the input grayscales IGS of the dynamic video DV to display the dynamic video DV.

The luminance measurer 20 may measure the luminance LUM of the dynamic video DV. For example, the luminance LUM of the dynamic video DV may be measured every 0.1 milliseconds. As shown in FIG. 14, the luminance measurer 20 may generate a dynamic video graph DG based on the luminance LUM of the dynamic video DV.

The response speed evaluator 30 may scale the dynamic video graph DG based on a maximum luminance and a minimum luminance of the dynamic video graph DG to normalize the dynamic video graph DG and to generate the output graph OG. For example, the maximum luminance of the dynamic video graph DG may be about 990 nit, and the minimum luminance of the dynamic video graph DG may be about 0 nit. As shown in FIG. 15, when the dynamic video graph DG is scaled, a value corresponding to about 990 nit may be 100%, and a value corresponding to about 0 nit may be 0%. The output graph OG may be the normalized dynamic video graph.

As such, the static image graphs SG1, SG2, SG3, SG4 and the dynamic video graph DG may be normalized, such that a unit of the static image graphs SG1, SG2, SG3, SG4 and a unit of the dynamic video graph DG may become equal as a percentage, and the static image graphs SG1, SG2, SG3, SG4 and the dynamic video graph DG may be compared with each other.

Figure 16:
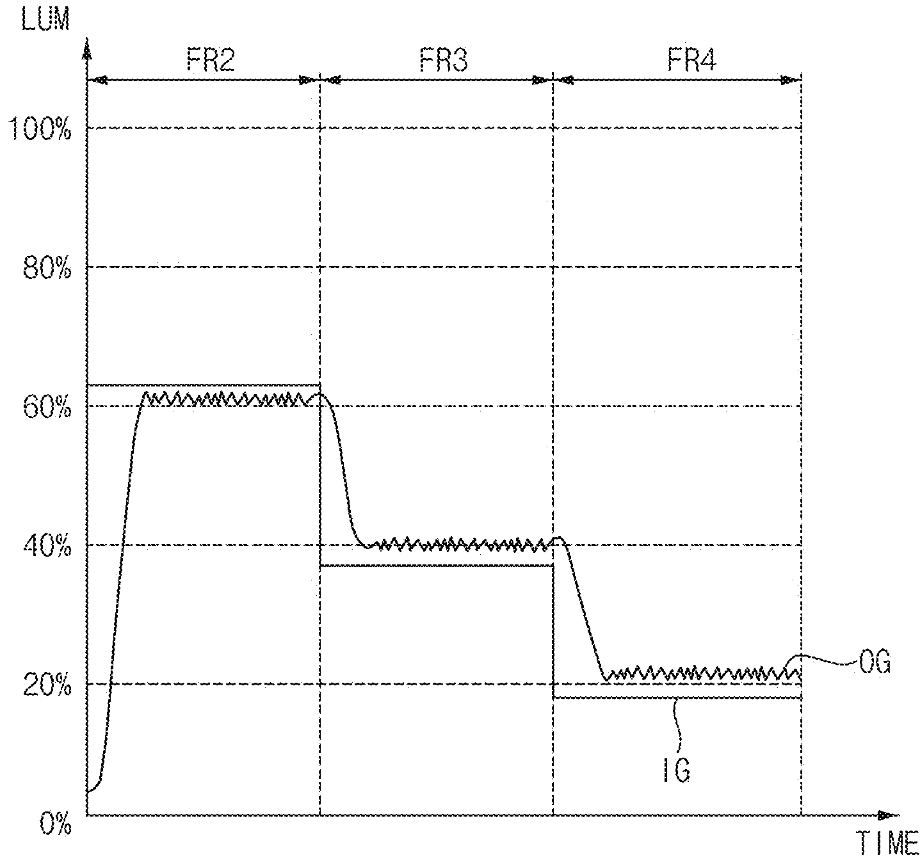
FIG. 16 is a diagram showing a comparison between an input graph and an output graph.

FIG. 16 is a diagram showing a comparison between an input graph IG and an output graph OG.

Referring to FIGS. 1 to 16, a response speed evaluator 30 may compare an input graph IG and an output graph OG to evaluate a response speed of a display 10 by. The output graph OG is a graph in which a response time RT of the display 10 is considered, and the input graph IG is a graph in which the response time RT of the display 10 is not considered. Therefore, the input graph IG and the output graph OG may be compared with each other, such that the response speed of the display 10 may be evaluated. For example, the more similar the output graph OG is to the input graph IG, the faster the response speed of the display 10.

In one or more embodiments, the response speed evaluator 30 may evaluate the response speed of the display 10 based on a difference between an area of the input graph IG and an area of the output graph OG. For example, the smaller the difference between the area of the input graph IG and the area of the output graph OG, the faster the response speed of the display 10 may be.

The difference between the area of the input graph IG and the area of the output graph OG may be evaluated based on a similarity index, and the similarity index may be calculated by a following mathematical formula.

$$S\_IND = \left\{1 - \frac{\int |OG\_LUM - IG\_LUM|}{\int IG\_LUM}\right\} \times 100$$

S_IND is the similarity index, IG_LUM is a luminance LUM of the input graph IG, and OG_LUM is a luminance LUM of the output graph OG.

In the mathematical formula, the area of the input graph IG may be calculated by a following Mathematical Formula 1, and the difference between the area of the input graph IG and the area of the output graph OG may be calculated by a following Mathematical Formula 2.

$$\int IG\_LUM \qquad \text{Mathematical Formula 1}$$

$$\int |OG\_LUM - IG\_LUM| \qquad \text{Mathematical Formula 2}$$

A range of the similarity index may be 0% to 100%. When the similarity index is relatively large, the difference between the area of the input graph IG and the area of the output graph OG may be relatively small, and the response speed of the display 10 may be relatively fast.

As such, an input grayscale IGS of each of static images SI may be determined based on input grayscales IGS of a dynamic video DV. Static image graphs SG1, SG2, SG3, SG4 may be generated based on a luminance LUM of the each of the static images SI, and a dynamic video graph DG may be generated based on a luminance LUM of the dynamic video DV. An input graph IG may be generated based on the static image graphs SG1, SG2, SG3, SG4, and an output graph OG may be generated based on the dynamic video graph DG. A response speed of a display 10 may be evaluated by comparing the input graph IG and the output graph OG. Therefore, the response speed of the display 10 displaying the dynamic video DV may be evaluated.

Figure 17:
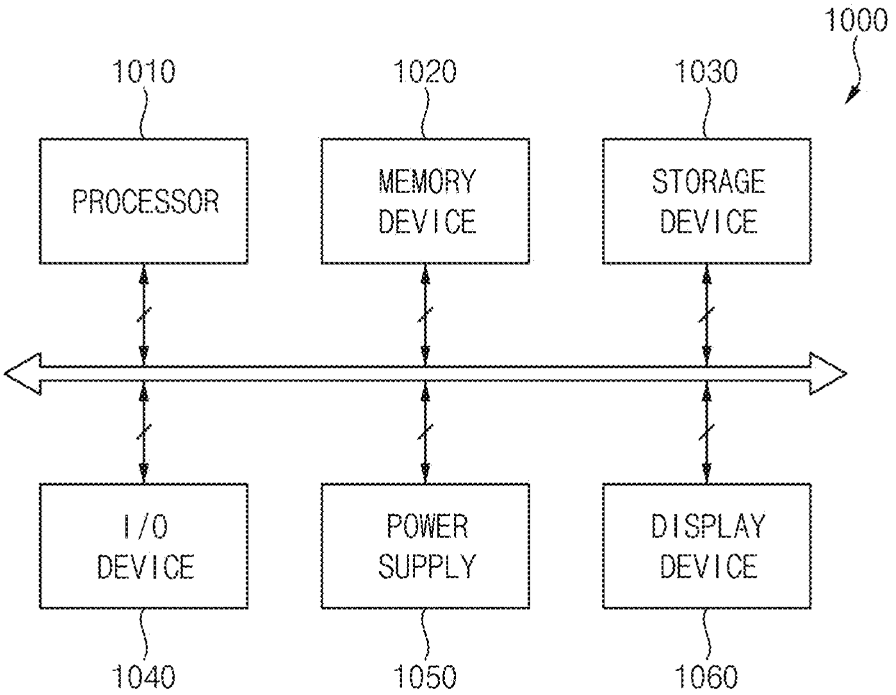
FIG. 17 is a block diagram illustrating an electronic device.
Figure 18:
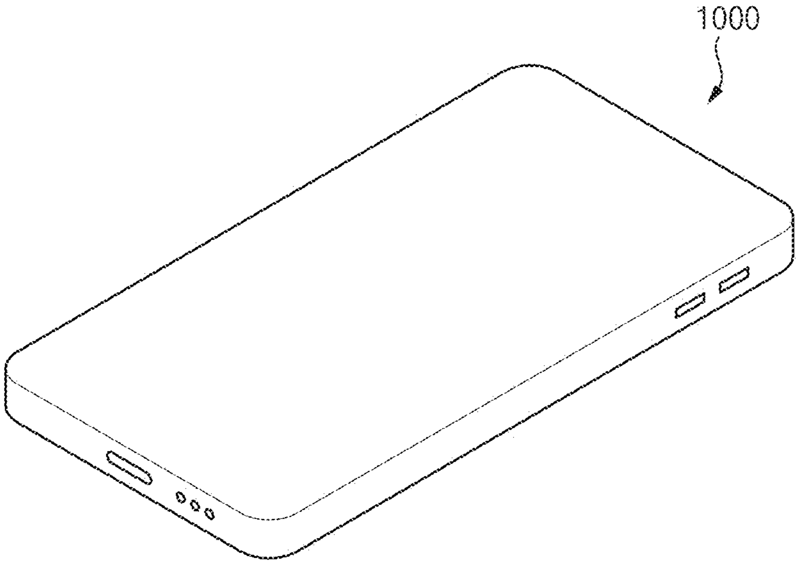
FIG. 18 is a diagram illustrating one or more embodiments in which an electronic device of FIG. 17 is implemented as a smart phone.

FIG. 17 is a block diagram illustrating an electronic device 1000. FIG. 18 is a diagram illustrating one or more embodiments in which an electronic device 1000 of FIG. 17 is implemented as a smart phone.

Referring to FIGS. 17 and 18, the electronic device 1000 may include a processor 1010, a memory device 1020, a storage device 1030, an input/output (I/O) device 1040, a power supply 1050, and a display 1060. The display 1060 may be the display 10 of FIG. 1. In addition, the electronic device 1000 may further include a plurality of ports for communicating with a video card, a sound card, a memory card, a universal serial bus (USB) device, other electronic device, and the like.

In one or more embodiments, as shown in FIG. 18, the electronic device 1000 may be implemented as the smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head-mounted display (HMD) device, and the like.

The processor 1010 may perform various computing functions. The processor 1010 may be a microprocessor, a central processing unit (CPU), an application processor (AP), and the like. The processor 1010 may be coupled to other components via an address bus, a control bus, a data bus, and the like. Further, the processor 1010 may be coupled to an extended bus, such as a peripheral component interconnection (PCI) bus.

The memory device 1020 may store data for operations of the electronic device 1000. For example, the memory device 1020 may include at least one nonvolatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like, and/or at least one volatile memory device, such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device, such as a keyboard, a keypad, a mouse device, a touch-pad, a touch-screen, and the like, and an output device, such as a printer, a speaker, and the like. In some embodiments, the I/O device 1040 may include the display 1060.

The power supply 1050 may provide power for operations of the electronic device 1000.

The display 1060 may be connected to other components through buses or other communication links.

The disclosed embodiments may be applied to any display and any electronic device including the touch panel. For example, the disclosed embodiments may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative, and is not to be construed as limiting thereof. Although a few embodiments of the present disclosure have been described, those skilled in the art will readily appreciate that many modifications are possible in the embodiments without materially departing from the aspects of the disclosed embodiments. Accordingly, all such modifications are intended to be included within the scope of the present disclosure as defined in the claims, with functional equivalents thereof to be included therein. In the claims, means-plus-function clauses are intended to cover the structures described herein as performing the recited function and not only structural equivalents but also equivalent structures. Therefore, it is to be understood that the foregoing is illustrative, and is not to be construed as limited to the embodiments disclosed, and that modifications to the disclosed embodiments, as well as other embodiments, are intended to be included within the scope of the appended claims. The present disclosure is defined by the following claims, with equivalents of the claims to be included therein.

What is claimed is:

1. A response speed evaluation system for a display device, comprising:

the display device configured to display a dynamic video, and to display one or more static images generated based on input grayscales of the dynamic video;

a luminance measurer configured to measure a luminance of the static images, to measure a luminance of the dynamic video, to generate static image graphs based on the luminance of the static images, and to generate a dynamic video graph based on the luminance of the dynamic video; and a response speed evaluator configured to generate an input graph based on the static image graphs, to generate an output graph based on the dynamic video graph, and to compare the input graph and the output graph to evaluate a response speed of the display device based on a difference between the input graph and the output graph.

2. The response speed evaluation system for the display device of claim 1, wherein the response speed evaluator is configured to scale the static image graphs based on a maximum luminance and a minimum luminance of the static image graphs to normalize the static image graphs.

3. The response speed evaluation system for the display device of claim 1, wherein the response speed evaluator is configured to calculate a representative value of a luminance of the static image graphs.

4. The response speed evaluation system for the display device of claim 3, wherein the representative value of the luminance of the static image graphs is a median value of the luminance of the static image graphs.

5. The response speed evaluation system for the display device of claim 4, wherein the response speed evaluator is configured to combine the static image graphs based on the representative value of the luminance of the static image graphs to generate the input graph.

6. The response speed evaluation system for the display device of claim 1, wherein the response speed evaluator is configured to scale the dynamic video graph based on a maximum luminance and a minimum luminance of the dynamic video graph to normalize the dynamic video, and to generate the output graph.

7. The response speed evaluation system for the display device of claim 1, wherein the response speed of the display device increases as similarity between the output graph and the input graph increases.

8. The response speed evaluation system for the display device of claim 1, wherein the response speed evaluator is configured to evaluate the response speed of the display device based on a difference between an area of the input graph and an area of the output graph.

9. The response speed evaluation system for the display device of claim 8, wherein the difference between the area of the input graph and the area of the output graph corresponds to a similarity index that is calculated by $$S_{IND} = \left\{1 - \frac{\int |OG_{LUM} - IG_{LUM}|}{\int IG_{LUM}}\right\} \times 100,$$

S_IND being the similarity index, IG_LUM being a luminance of the input graph, and OG_LUM being a luminance of the output graph.

10. The response speed evaluation system for the display device of claim 9, wherein the difference between the area of the input graph and the area of the output graph decreases and the response speed of the display device increases as the similarity index increases.

11. A response speed evaluation system for an electronic device, comprising:

the electronic device comprising a display device configured to display a dynamic video and to display one or more static images generated based on input grayscales of the dynamic video, and a processor configured to control the display device;

a luminance measurer configured to measure a luminance of the static images, to measure a luminance of the dynamic video, to generate static image graphs based on the luminance of the static images, and to generate a dynamic video graph based on the luminance of the dynamic video; and a response speed evaluator configured to generate an input graph based on the static image graphs, to generate an output graph based on the dynamic video graph, and to compare the input graph and the output graph to evaluate a response speed of the display device based on a difference between the input graph and the output graph.

12. A method of driving a response speed evaluation system for a display device, the method comprising:

determining an input grayscale of static images based on input grayscales of a dynamic video;

measuring a luminance of the static images;

measuring a luminance of the dynamic video;

generating static image graphs based on the luminance of the static images;

generating a dynamic video graph based on the luminance of the dynamic video;

generating an input graph based on the static image graphs;

generating an output graph based on the dynamic video graph; and comparing the input graph and the output graph to evaluate a response speed of the display device based on a difference between the input graph and the output graph.

13. The method of claim 12, wherein the generating the input graph and the generating the output graph comprises scaling the static image graphs based on a maximum luminance and a minimum luminance of the static image graphs to normalize the static image graphs.

14. The method of claim 13, wherein the generating the input graph and the generating the output graph further comprises calculating a representative value of a luminance of the static image graphs.

15. The method of claim 14, wherein the representative value of the luminance of the static image graphs comprises a median value of the luminance of the static image graphs.

16. The method of claim 14, wherein the generating the input graph and the generating the output graph further comprises combining the static image graphs based on the representative value of the luminance of the static image graphs to generate the input graph.

17. The method of claim 16, wherein the generating the input graph and the generating the output graph further comprises scaling the dynamic video graph based on a maximum luminance and a minimum luminance of the dynamic video graph to normalize the dynamic video and to generate the output graph.

18. The method of claim 12, wherein the response speed of the display device increases as a similarity between the output graph and the input graph increases.

19. The method of claim 12, wherein the response speed of the display device corresponds to a difference between an area of the input graph and an area of the output graph.

20. The method of claim 19, wherein the difference between the area of the input graph and the area of the output graph corresponds to a similarity index calculated by $$S_{IND} = \left\{1 - \frac{\int |OG_{LUM} - IG_{LUM}|}{\int IG_{LUM}}\right\} \times 100,$$

S_IND being the similarity index, IG_LUM being a luminance of the input graph, and OG_LUM being a luminance of the output graph.

* * * * *